Sept. 18, 1956 K. E. FARR 2,763,716

COLOR TELEVISION RECEIVER APPARATUS

Filed Sept. 4, 1953 2 Sheets-Sheet 1

Fig. I.

INVENTOR

Kenneth E. Farr.

BY F. E. Browder

ATTORNEY

COLOR TELEVISION RECEIVER APPARATUS

Filed Sept. 4, 1953 2 Sheets-Sheet 2

INVENTOR
Kenneth E. Farr.
BY F. E. Browder
ATTORNEY

United States Patent Office 2,763,716

Patented Sept. 18, 1956

2,763,716

COLOR TELEVISION RECEIVER APPARATUS

Kenneth E. Farr, Paxinos, Pa., assignor to Westinghouse Electric Corporation, East Pittsburgh, Pa., a corporation of Pennsylvania Application September 4, 1953, Serial No. 378,564

15 Claims. (Cl. 178—5.4)

The present invention relates to color television receiver apparatus, and more particularly to an improved circuit arrangement for color television receiver apparatus for use with the current National Television Systems Committee (hereinafter referred to as NTSC) composite color signal.

It is an object of the present invention to provide improved color television receiver apparatus, and more particularly to provide such receiver apparatus for use in reproducing televised pictures which have been transmitted by means of the NTSC composite color signal having a monochrome component and a plurality of color difference components.

It is another object of this invention to provide an improved color television receiver apparatus circuit for use with the NTSC composite color signal for combining the provided monochrome component signal or voltage with the provided color difference component signals or voltages for the control of a tricolor picture tube of such receiver apparatus.

It is a further object of this invention to provide a color television receiver circuit wherein the monochrome component signal is combined with the color difference component signals such that separate color control signals are thereby derived for directly controlling the operation of the provided tricolor picture display tube.

It is an additional object of this invention to provide an improved color television receiver apparatus circuit such that more flexible and more readily adjustable color control signals or voltages can be provided for controlling the operation of the tricolor picture tube.

It is still another object of this invention to provide a separate or an external matrix circuit for a color television receiver adapted to receive particularly the NTSC composite color signal.

It is a still further object of this invention to provide an improved circuit arrangement for combining the monochrome signal with the respective color difference signals, with provision being made to compensate for the effective signal delay caused by narrow banding the color difference signals.

It is a still additional object of this invention to provide an improved NTSC color receiver circuit which includes delay and gain compensation features to improve the controlled operation of the receiver apparatus picture tube.

In accordance with the current NTSC color television signal, the picture information is transmitted by two simultaneous signal or voltage components. One of these components is called the monochrome signal and it supplies all the luminance (picture brightness) information. This is transmitted in accordance with the Federal Communications Commission standards for black-and-white television and it may be received by the present black-and-white television receivers without any change being required therein. The other signal component is called the color subcarrier. This color subcarrier signal supplies the picture coloring information which, when added electrically to the monochrome signal and supplied to a tricolor picture tube, reproduces for visual display the televised colored picture. The video spectrum of the complete NTSC color picture consists of a monochrome signal located near even harmonics of half line frequency and the color subcarrier which is located at an odd harmonic of the half line frequency, with the sidebands of the color subcarrier interleaved between those of the monochrome signal component. The monochrome signal voltage (which is hereinafter referred to as $E_Y$) can be obtained directly from a camera pickup tube whose output is equal to luminance. It is made up by combining the separate color control signals (hereinafter referred to as $E_R$, $E_G$ and $E_B$) which are respectively related to the red, green and blue reproducing primaries, that are derived from a three-color camera. The three color control signals are combined in proportion to their contribution to the total luminance such that the following formula relationship is representative:

$$E_Y=0.59E_G+0.30E_R+0.11E_B$$

The above expression indicates that the respective green, red and blue reproducing primaries contribute 59, 30 and 11 percent of the luminance of white (defined by the chromaticity coordinates $x=0.310$; $Y=0.316$).

Since it is desirable that the coloring information disappear when there is no color in the televised picture, this information is transmitted in terms of two sub-components which are called color difference signals or voltages and may be represented as $(E_R-E_Y)$ and $(E_B-E_Y)$. These color difference signals are usually limited in bandwidth to 1 or 2 mc. since the eye is insensitive to color in fine detail. Green color information, when present in the picture, is transmitted by these color difference signals even though it is not provided as a separate color difference signal. Green color information is obtained in the color receiver by a mixture of the two color difference signals such that $(E_G-E_Y)$ can be obtained by a mixture of $-0.51$ $(E_R-E_Y)$ and $-0.19$ $(E_B-E_Y)$, with the following formula being illustrative of this relationship:

$$(E_G-E_Y=-0.51\ (E_R-E_Y)-0.19\ (E_B-E_Y)$$
$$=0.41\ E_G-0.30\ E_R-0.11\ E_B$$

To obtain the color control signals $E_R$, $E_G$ and $E_B$, the color receiver apparatus adds the luminance or monochrome signal $E_Y$ to each of the color difference signals, as follows:

$$(E_R-E_Y)+E_Y=E_R$$
$$(E_B-E_Y)+E_Y=E_B$$
$$(E_G-E_Y)+E_Y=E_G$$

In accordance with the prior art color receiver apparatus for reproducing a colored picture which has been televised in accordance with the NTSC composite color signal, the combination of the monochrome or luminance signal $E_Y$ with each of the color difference signals $(E_R-E_Y)$, $(E_B-E_Y)$ and $(E_G-E_Y)$ was accomplished by applying the monochrome signal $E_Y$ to one of the electrodes in each gun of the tricolor picture tube such, for example, as the control grid and to apply the color difference signals respectively to the other grid of each electron gun in the tricolor picture tube, for example the cathode. This arrangement was known as an internal matrix circuit, and is subject to the objection that it does not admit of as much flexibility as is desired in the adjustment of the signals or voltages which are applied to each of the electron guns in the tricolor picture tube.

In accordance with the present invention an improved circuit arrangement is provided wherein separate or external matrixing is provided such that separate color control signals $E_R$, $E_B$ and $E_G$ are provided, which separate color control signals may be readily adjusted independently as required for the desired operation of the color picture display tube.

The present invention, both as to its organization and method of operation, together with further objects and advantages thereof, will be better understood by reference to the following description taken in connection with the accompanying drawings, in which.

Figure 1:
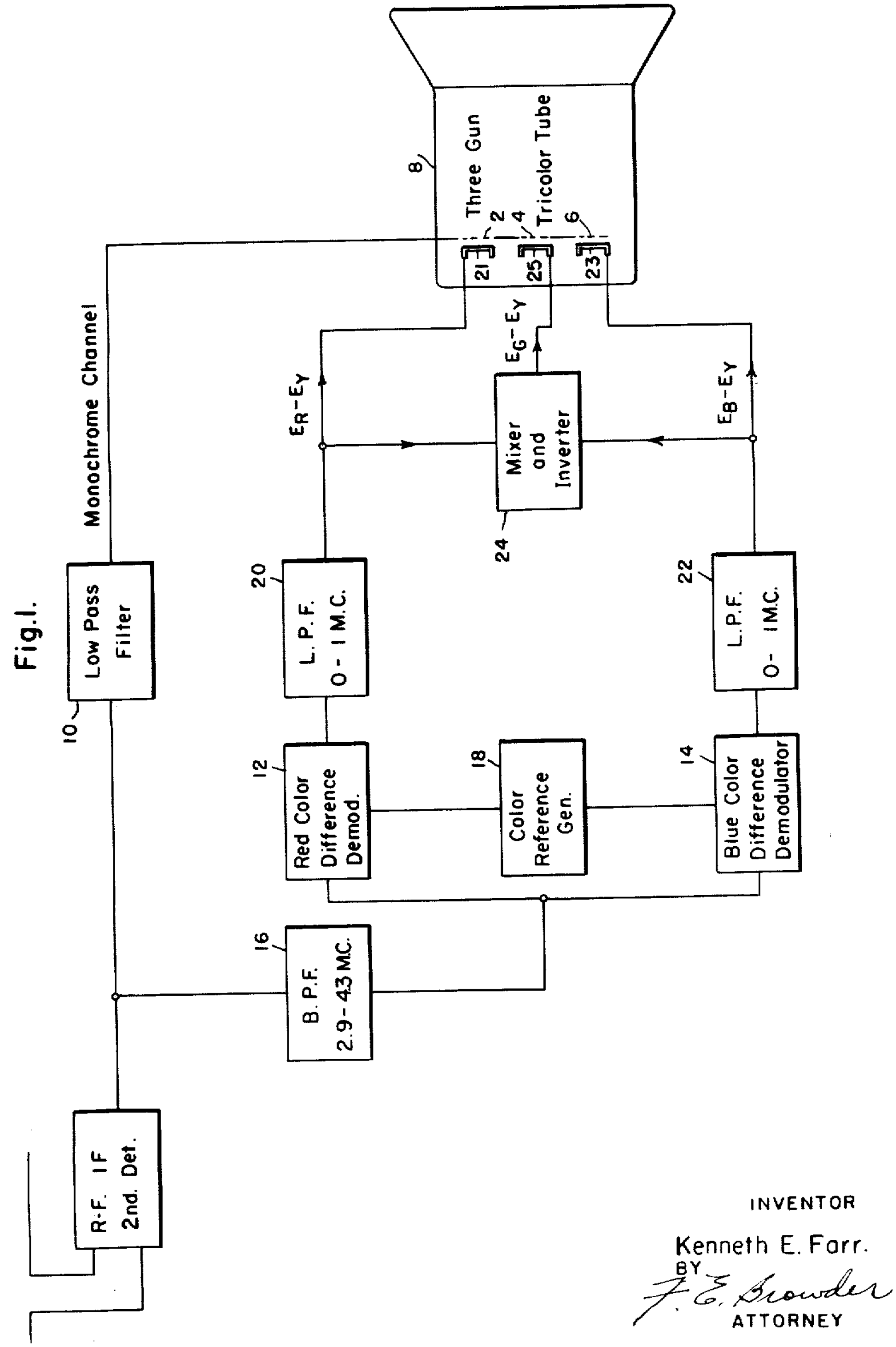
Figure 1 is a block diagram and schematic illustration of the prior art NTSC color television receiving apparatus.

Referring to Fig. 1 of the drawings, there is shown a schematic and block diagram circuit illustration of a typical prior art NTSC color television receiver, wherein the complete color signal comprising the monochrome component $E_Y$ plus the color subcarrier component are applied to the respective control grids 2, 4 and 6 of a tricolor picture tube 8. This complete or composite color signal effectively drives the three control grids 2, 4 and 6 equally and would produce, if desired, a monochrome picture on the picture tube 8. A low-pass filter 10 can be provided in the monochrome channel, if desired, to reduce the color subcarrier in the monochrome channel as a remedy for color desaturation due to nonlinearity of the picture tube 8. The composite color signal is also applied to a pair of color difference demodulators 12 and 14 through a bandpass filter 16 which latter filter is provided to attenuate the low frequency monochrome signal components and the low frequency sound carrying components of the composite color signal.

The foregoing discussion is oversimplified and does not take into account the gamma correction process which corrects for the picture tube operation wherein the light output of the picture tube 8 is not directly proportional to the electrical input, but instead varies as a power gamma of this applied electrical input.

As part of the composite color signal which is transmitted to the color receiver apparatus, there is a burst signal which is transmitted at a constant reference phase following each horizontal synchronizing pulse, and is used in the color receiver apparatus to accurately control the apparatus of a color reference generator 18 at a frequency of 3.58 mc. at the present time, which color reference generator 18 feeds and controls the respective red color and blue color difference synchronous demodulators 12 and 14. The outputs from the respective red color and blue color difference demodulators 12 and 14 are passed through respective low-pass filters 20 and 22 to respectively two cathodes 21 and 23 of the three provided cathodes of the tricolor picture reproducing tube 8.

To obtain the green color difference signal ($E_G-E_Y$), the outputs of the respective red color and blue color difference demodulators 12 and 14 are combined in a mixer and inverter circuit 24. The green color difference signal ($E_G-E_Y$) is applied to the third cathode 25 of the tricolor picture reproducing tube 8. It should be noted respecting the prior art NTSC color receiver apparatus that the operation of the respective red color and blue color difference demodulators 12 and 14 is such that the respective red and blue color difference signals ($E_R-E_Y$) and ($E_B-E_Y$) are separated from the composite NTSC color signal by applying the latter signal to the input circuits of the respective color difference demodulators 12 and 14, which are synchronous demodulators, to which are also applied the reference voltage of proper phase from the color reference generator 18 which as above set forth is controlled by the burst signal transmitted as part of the composite NTSC color signal. In the operation of the mixer and inverter circuit 24, the green color difference signal ($E_G-E_Y$) is obtained by a mixture of $-0.51$ ($E_R-E_Y$) and $-0.19$ ($E_B-E_Y$). The three color difference signals are applied, as shown in Fig. 1 of the drawings, to the respective cathodes of the tricolor picture tube and since this tube is operated by the cathode-grid voltage of the respective electron guns of the tube, the light output of the respective guns is directly proportional to the resultant color control signals $E_R$, $E_G$ and $E_B$. In this respect each electron gun comprises a cooperative cathode and grid arrangement, with three such guns being shown in Fig. 1 for picture tube 8.

Figure 2:
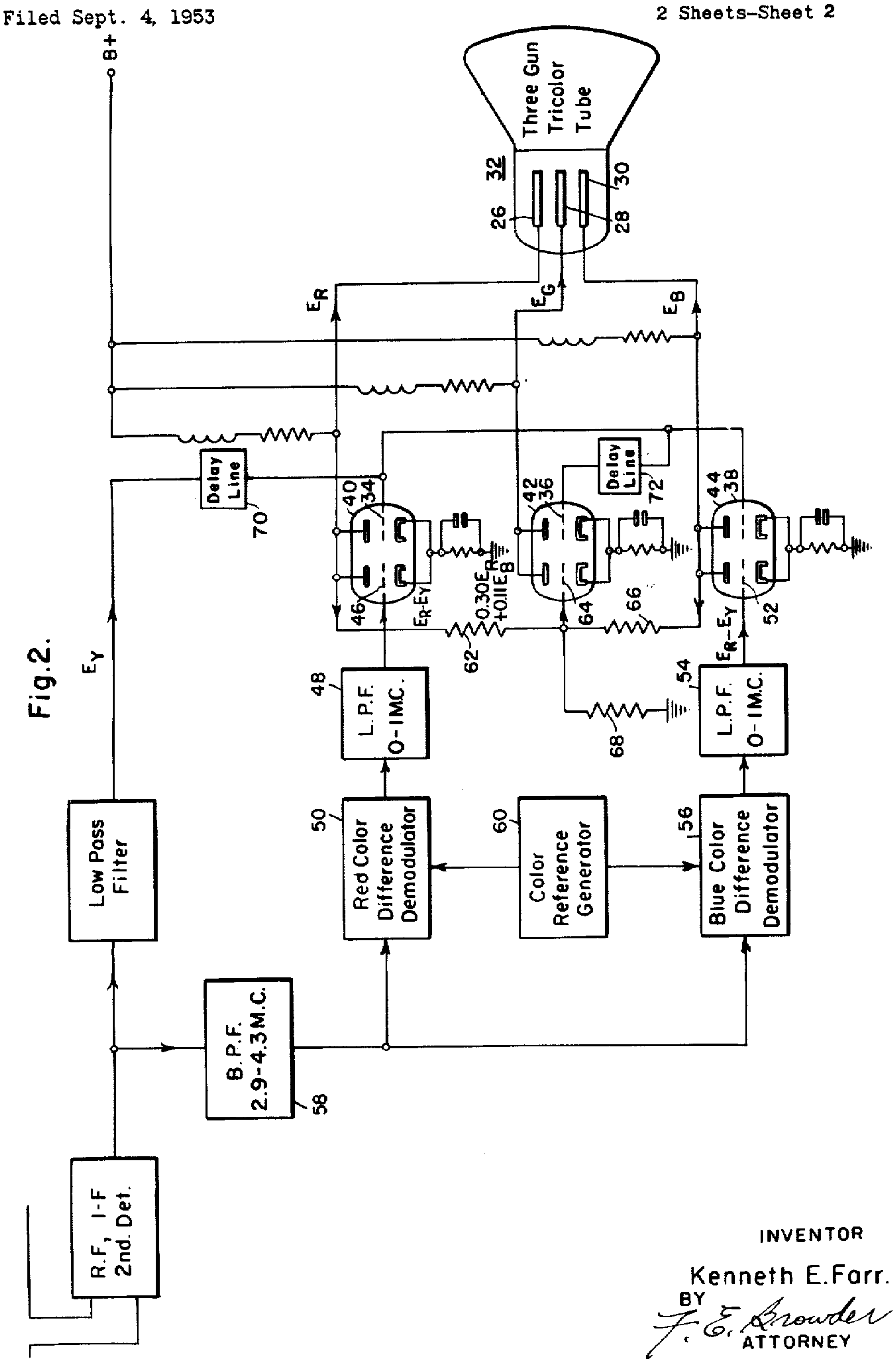
Fig. 2 is a block diagram and schematic illustration of the circuit of the improved NTSC color television receiving apparatus in accordance with a preferred modification of the present invention.

Referring to Fig. 2 of the drawings, there is shown an improved circuit arrangement for a NTSC color television receiver, wherein separate or external matrixing is accomplished such that the color control signals $E_R$, $E_G$ and $E_B$ are applied directly to the respective control guns 26, 28 and 30 of a tricolor picture tube 32, and which may be adjusted independently as desired for the operation of the tricolor picture tube. As shown in Fig. 2, the monochrome or luminance signal $E_Y$ is applied to the control grids 34, 36 and 38 of one-half of respectively three dual triode electron discharge devices or tubes 40, 42 and 44, which are operative as signal mixing or combining devices. These latter discharge devices may, within the scope of this invention, comprise respectively separate triodes rather than duel triodes, or comprise separate or combined multi-element tubes having more than a single control grid for controlling the respective electron paths. The control grid 46 of the other half of the first of the dual-triode discharge devices 40 is connected through a low pass filter 48 to the output of the red color difference demodulator 50. The other control grid 52 of the other half of the third dual triode electron discharge device 44 is connected through a low pass filter 54 to the output of the blue color difference demodulator 56.

The operation of the provided low pass filters 48 and 54, the bandpass filter 58, the color reference generator 60 and the respective red and blue color difference demodulators 50 and 56 are substantially the same in the circuit arrangement of Fig. 2 as that of the circuit arrangement of Fig. 1.

The two anodes of the first dual-triode tube 40 are connected in common and connected through a control resistor or impedance 62 to the control grid 64 of the other half of the second dual-triode discharge device 42. The two anodes of the third electron discharge device 44 are commonly connected through a dropping or control resistance or impedance 66 to the same control grid 64 of the other half of the second electron discharge device 42. The latter control grid 64 is also connected to ground through a third control or dropping resistance or impedance 68. The necessary plate voltage for the first, second and third dual-triode electron discharge devices 40, 42 and 44 is provided through suitable dropping impedance circuits to a common plate or B+ voltage supply source.

The operation of the first dual-triode electron discharge device 40 is such that in its output circuit there is provided the red color control signal $E_R$ which is applied to a first electron gun 26 of a tricolor picture tube 32. In the output circuit of the second dual-triode electron discharge device 42 there is provided the green color control signal $E_G$ which is supplied to the second electron gun 28 of the tricolor tube 32. In the output circuit of the third dual-triode electron discharge device 44 there is provided the blue color control signal $E_B$, which is applied to the third electron gun 30 of the tricolor picture tube 32.

Since the color difference signals ($E_R-E_Y$) and ($E_B-E_Y$) as applied to the respective first and third dual triode electron discharge devices 40 and 44 in effect are delayed due to the narrow banding of these signals, it is necessary to introduce an added delay line 70 into the monochrome or luminance signal channel to compensate for such delay of the latter color difference signals.

It will be seen that in the output circuit of particularly the first dual-triode electron discharge device 40 there will appear the electrical sum of the red color difference signal ($E_R-E_Y$) and the monochrome signal $E_Y$, which sum is reversed in polarity such that the monochrome component $E_Y$ effectively cancels out to leave only the color control signal $E_R$ present in the output of this tube 40. In the operation of the third dual-triode electron discharge device 44 the blue color difference signal $(E_B-E_Y)$ is present in combination with the monochrome signal $E_Y$, with the polarities reversed, such that only the blue color control signal $E_B$ is provided. It should be noted that the gain A of the respective tubes or electron discharge devices 40 and 44 will make the respective output color control signals $AE_R$ and $AE_B$, however this relationship is not otherwise specifically set forth for simplicity of description. In the operation of the second dual-triode discharge device 42 there is made to appear the sum of the 0.30 $E_R$ plus 0.11 $E_B$ signal and the monochrome signal $E_Y$ reversed in polarity, such that only the green color control signal $E_G$ is present in the output of this tube. This is accomplished by determining the control impedance 62 such that 0.30 of the red color control signal $E_R$ is applied to control grid 64 from the output circuit of first dual-triode tube 40, and similarly control impedance 66 is effective to apply 0.11 of the blue color control signal $E_B$ from the output of third dual-triode tube 44.

In accordance with the operation of the second dual-triode discharge device 42, since the monochrome signal $E_Y$ which is applied to one grid 36 of the second discharge device 42 already contains portions of the red color and blue color difference signals $(E_R-E_Y)$ and $(E_B-E_Y)$ in accordance with the following relationship $E_Y=0.59E_G+0.30\ E_R+0.11E_B$, it is only necessary that the above-described predetermined amounts of the respective red and blue color control signals $E_R$ and $E_B$ need be applied to the other control grid 64 of the second discharge device 42 to recover the green color control signal $E_G$. This is further accomplished by making the gain or amplification factor of the second dual-triode discharge device 42 equivalent to 0.59 times the gain of either the first or third dual-triode discharge devices 40 and 44 with the respective gain of the latter first and third discharge devices being equal. Under the conditions of the latter gain relationships, the following will show how the green color control signal $E_G$ is obtained:

$$E_G=\frac{1}{0.59}(E_Y-0.30E_R-0.11E_B) \qquad (6)$$

The latter formula relationship should be apparent from Formula 1 above set forth.

In this respect it may be desirable to introduce a second and additional delay line 72 in the circuit of the control grid 36 of the second electron discharge device 42 which control grid 36 is the one to which the monochrome signal component $E_Y$ is applied. This additional delay of the monochrome signal $E_Y$ is desirable in the operation of particularly the second electron discharge device 42 since the respective red color control signal $E_R$ as applied to the other control grid 64 of the second discharge device 42 from the plate circuit of the first electron discharge device 40 is delayed due to the passband of the output circuit of the latter discharge device 40, and due to the fact that the blue color control signal $E_B$ as applied to the other control grid 64 of the second discharge device 42 is similarly delayed due to the passband of the output circuit of the third discharge device 44.

The green color control signal $E_G$ may be thus slightly delayed by the additional delay line 72 relative to both the red color control signal $E_R$ and the blue color control signal $E_B$, which delay of the green color control signal $E_G$ can be readily compensated for by shifting the registration in the tricolor picture display tube 32 as well known in the art.

While there has been illustrated and described the preferred embodiment of this invention as now known, it will be apparent to those skilled in the art that many changes may be made in the form of the apparatus disclosed without departing from the spirit of this invention.

I claim as my invention:

1. In color television receiver apparatus having a tricolor picture reproducing tube, the combination of a monochrome signal source, a first color difference signal source, a second color difference signal source, a first mixer circuit having a plurality of inputs, a second mixer circuit having a plurality of inputs, a third mixer circuit having a plurality of inputs, with said monochrome signal source connected to one of the inputs of each of said mixer circuits, with said first color difference signal source connected to another input of said first mixer circuit, and with the second color difference signal source connected to another input of the third mixer circuit.

2. In color television receiver apparatus, the combination of a source of monochrome signal, a source of first color difference signal, a source of second color difference signal, a first mixer circuit comprising an electron discharge device having a plurality of inputs, a second mixer circuit comprising an electron discharge device having a plurality of inputs, a third mixer circuit comprising an electron discharge device having a plurality of inputs, with said source of monochrome signal connected to one of the inputs of each of said first, second and third mixer circuits, with said source of first color difference signal connected to another of the inputs of the first mixer circuit, and with the source of the second color difference signal connected to another input of the third mixer circuit.

3. The apparatus of claim 1, wherein the first and third mixer circuits each have an output and with the outputs of each of the first and third mixer circuits being commonly connected to another input of the second mixer circuit.

4. The apparatus of claim 2, with the first and third mixer circuits, wherein the first and third mixer circuits each have an output and with the outputs of each of the first and third mixer circuits being commonly connected to another input of the second mixer circuit.

5. In color television receiver apparatus, the combination of a monochrome voltage source, a first color difference voltage source, a second color difference voltage source, a first mixer circuit having an output and a plurality of inputs, a second mixer circuit having a plurality of inputs, a third mixer circuit having an output and a plurality of inputs, with said monochrome voltage source commonly connected to one of the inputs of each of said first, second and third mixer circuits, with the first color difference voltage source connected to another input of the first mixer circuit, and with the second color difference voltage source connected to another input of the third mixer circuit, said output of the first mixer circuit being connected to another input of the second mixer circuit through a series impedance.

6. The apparatus of claim 5, with said output of the third mixer circuit being connected to said another input of the second mixer circuit through a second series impedance.

7. In color television receiver apparatus adapted for the reproduction of a televised picture from a composite color signal including a monochrome signal and a color subcarrier, the combination of a monochrome signal source, a first color difference signal source, a second color difference signal source, a first mixer circuit comprising a first dual-triode electron discharge device having a pair of anodes, a pair of cathodes and a first and second control grid, a second mixer circuit comprising a second dual-triode electron discharge device having a pair of anodes, a pair of cathodes and a first and second control grid, a third mixer circuit comprising a third dual-triode electron discharge device having a pair of anodes, a pair of cathodes and a pair of control grids, said monochrome signal source being connected to one of the control grids of each of the first and second dual-triode electron discharge devices, with the first color difference signal source connected to the other control grid of the first dual-triode electron discharge device, and with the second color difference signal source connected to the other control grid of the second dual-triode electron discharge device.

8. In color television receiver apparatus adapted for the reproduction of a televised picture from a composite color signal including a monochrome signal and a color subcarrier, the combination of a monochrome signal source, a first color difference signal source, a second color difference signal, a first mixer circuit comprising a first dual-triode electron discharge device having a pair of anodes, a pair of cathodes and a first and second control grid, a second mixer circuit comprising a second dual-triode electron discharge device having a pair of anodes, a pair of cathodes and a first and second control grid, a third mixer circuit comprising a third dual-triode electron discharge device having a pair of anodes, a pair of cathodes and a pair of control grids, said monochrome signal source being connected to one of the control grids of each of the first and second dual-triode electron discharge devices, with the first color difference signal source connected to the other control grid of the first dual-triode electron discharge device, with the second color difference signal source connected to the other control grid of the second dual-triode electron discharge device, with the first and second mixer circuits respectively having an output, with the output of the first mixer circuit connected to one of the control grids of the third mixer circuit, and with the output of the second mixer circuit connected to the latter said one control grid of the third mixer circuit.

9. In color television receiver apparatus, the combination of a monochrome voltage source, a first color difference voltage source, a second color difference voltage source, a first mixer circuit comprising an electron discharge device having a predetermined gain and having a plurality of inputs, a second mixer circuit comprising an electron discharge device having a predetermined gain and a plurality of inputs, a third mixer circuit comprising an electron discharge device having a predetermined gain and a plurality of inputs, said monochrome voltage source being connected to one of the inputs of each of said first and third mixer circuits, with the first color difference voltage source connected to another of said inputs of the first mixer circuit, with the second color difference voltage source connected to another of said inputs of the third mixer circuit, and with the gain of the second mixer circuit electron discharge device being less than the gain of the first mixer circuit electron discharge device and the gain of the third mixer circuit electron discharge device.

10. In color television receiver apparatus, the combination of a monochrome voltage source, a first color difference voltage source, a second color difference voltage source, a first mixer circuit comprising an electron discharge device having a predetermined gain and having a plurality of inputs and an output, a second mixer circuit comprising an electron discharge device having a predetermined gain and a plurality of inputs, a third mixer circuit comprising an electron discharge device having a predetermined gain and a plurality of inputs and an output, said monochrome voltage source being connected to one of the inputs of each of said first and third mixer circuits, with the first color difference voltage source connected to another of said inputs of the first mixer circuit, with the second color difference voltage source connected to another of said inputs of the third mixer circuit, and with the gain of the second mixer circuit electron discharge device being less than the gain of the first mixer circuit electron discharge device and the gain of the third mixer circuit electron discharge device, and with the respective outputs of said first and third mixer circuits being connected to one of the inputs of the second mixer circuit.

11. A monochrome signal source, a first color difference signal source, a second color difference signal source, a first mixer circuit having a plurality of inputs, a second mixer circuit having a plurality of inputs, and a third mixer circuit having a plurality of inputs, with said source of monochrome signal connected to one of said inputs of each of the first and third mixer circuits, and with said source of monochrome signal being connected through a delay line to one of the inputs of the second mixer circuit.

12. A monochrome signal source, a first color difference signal source, a second color difference signal source, a first mixer circuit having a plurality of inputs and an output, a second mixer circuit having a plurality of inputs, and a third mixer circuit having a plurality of inputs and an output, with said source of monochrome signal connected to one of said inputs of each of the first and third mixer circuits, and with said source of monochrome signal being connected through a delay line to one of the inputs of the second mixer circuit, and with the respective outputs of said first and third mixer circuits being connected to one of said inputs of the second mixer circuit.

13. A monochrome signal source, a first color difference signal source, a second color difference signal source, a first mixer circuit having a plurality of inputs and an output, a second mixer circuit having a plurality of inputs, and a third mixer circuit having a plurality of inputs and an output, with said source of monochrome signal connected to one of said inputs of each of the first and third mixer circuits, and with said source of monochrome signal being connected through a delay line to one of the inputs of the second mixer circuit, with said output of the first mixer circuit being connected through a predetermined impedance to one of said inputs of the second mixer circuit and with said output of the third mixer circuit being connected through a second predetermined impedance to said one input of the second mixer circuit.

14. In color television receiver apparatus the combination of a monochrome signal source, a first color difference signal source, a second color difference signal source, a first mixer circuit having a plurality of inputs and an output, a second mixer circuit having a plurality of inputs and an output, a third mixer circuit having a plurality of inputs and an output, said monochrome signal source being connected to one of the inputs of each of the first, second and third mixer circuits, a tricolor picture tube having a first, second and third electron gun members, said output of the first mixer circuit being connected to another input of said second mixer circuit and to the first of said electron gun members, said output of the second mixer circuit being connected to the second of said electron gun members, and said output of the third mixer circuit being connected to said another input of the second mixer circuit and to the third of said electron gun members.

15. In color television receiver apparatus, the combination of a monochrome signal source, a first color difference signal source, a second color difference signal source, a first mixer circuit comprising a first and a second electron discharge device with each of said first and second electron discharge devices including an anode, a cathode and a control grid, a second mixer circuit comprising a third and a fourth electron discharge device with each of said third and fourth electron discharge devices including an anode, a cathode and a control grid, a third mixer circuit comprising a fifth and a sixth electron discharge device with each of said fifth and sixth electron discharge devices including an anode, a cathode and a control grid, said monochrome signal source being connected to the control grid of each of the first and third electron discharge devices, said first color difference signal source being connected to the control grid of the second electron discharge device, said second color difference signal source being connected to the control grid of the fourth electron discharge device, with the first and second mixer circuits respectively having an output, with the outputs of the first and second mixer circuits connected to the control grid of the fifth electron discharge device, and with said monochrome signal source being connected through a delay line to the control grid of the sixth electron discharge device.

References Cited in the file of this patent

UNITED STATES PATENTS

| | | |
|---|---|---|
| 2,566,707 | Sziklai | Sept. 4, 1951 |
| 2,627,549 | Kell | Feb. 3, 1953 |
| 2,664,462 | Bedford | Dec. 29, 1953 |
| 2,697,744 | Richman | Dec. 21, 1954 |

Notice of Adverse Decisions in Interferences

In Interference No. 88,971 involving Patent No. 2,763,716, K. E. Farr, COLOR TELEVISION RECEIVER APPARATUS, final judgment adverse to the patentee was rendered Jan. 13, 1961, as to claims 2 and 11, and Sept. 13, 1973, as to claim 7.

[*Official Gazette December 25, 1973.*]